United States Patent [19]
Frank et al.

[11] Patent Number: 5,267,627
[45] Date of Patent: Dec. 7, 1993

[54] VEHICLE STABILITY AUGMENTATION SYSTEM

[75] Inventors: Andrew A. Frank, El Macero; Yoshiyuki Yasui, Davis, both of Calif.

[73] Assignee: IMRA America, Inc., Ann Arbor, Mich.

[21] Appl. No.: 858,719

[22] Filed: Mar. 27, 1992

[51] Int. Cl.$^5$ .............................................. B62D 5/06
[52] U.S. Cl. .................................. 180/132; 180/142; 180/152
[58] Field of Search ............... 180/132, 141, 142, 143, 180/148, 152

[56] References Cited

U.S. PATENT DOCUMENTS

| | | | |
|---|---|---|---|
| 4,049,961 | 9/1977 | Marcy | 250/202 |
| 4,499,964 | 2/1985 | Abe et al. | 180/142 |
| 4,558,759 | 12/1985 | Baatrup et al. | 180/132 |
| 4,836,319 | 6/1989 | Haseda et al. | 180/142 |
| 4,871,952 | 10/1989 | Ishizaka et al. | 180/142 |
| 4,909,342 | 3/1990 | Janson et al. | 180/140 |
| 4,909,343 | 3/1990 | Mouri et al. | 180/142 |
| 4,940,105 | 7/1990 | Matsunaga et al. | 180/142 X |
| 4,949,803 | 8/1990 | Janson et al. | 180/140 |
| 4,955,445 | 9/1990 | Kanas | 180/133 |
| 5,082,076 | 1/1992 | Oshita et al. | 180/142 X |

FOREIGN PATENT DOCUMENTS 0427029  5/1991  European Pat. Off. ............ 180/142
1414206 11/1975  United Kingdom .

Primary Examiner—Margaret A. Focarino
Assistant Examiner—Victor E. Johnson
Attorney, Agent, or Firm—Burns, Doane, Swecker & Mathis

[57] ABSTRACT

A stability augmentation system and hydrostatic power steering system including an electric motor is provided for a automotive vehicle. The hydrostatic power steering system utilizes a power steering piston responsive to movement of the rack element of the rack and pinion steering connection. A torque sensor is connected to the steering shaft for providing an output torque signal to a power steering controller. The electric motor of the system is responsive to a command signal generated by the power steering controller. An electrically operated valve is connected to the hydraulic lines and is adapted to receive a signal from the power steering controller for controlling flow of hydraulic fluid to the power steering chamber. The electrically operated valve arrangement is rendered inoperative within a predetermined zone defined by the command signal and the output torque signal. The stability augmentation system includes a hydraulic system having a separate oil pump and electric motor. The motor is controlled by a stability augmentation system controller through inputs from a steering wheel angle sensor, vehicle speed sensor, yaw rate sensor and a position sensor.

15 Claims, 8 Drawing Sheets

VEHICLE STABILITY AUGMENTATION SYSTEM

BACKGROUND OF THE INVENTION

The present invention relates to a vehicle stability augmentation system in conjunction with a hydraulic and electric power steering control system for a motor vehicle and more particularly, for controlling the steering angle of the wheels to be steered of the vehicles in accordance with the state of movement of the motor vehicle to which the system is applied.

Various types of steering apparatuses for motor vehicles have been developed. Such examples include electric motor-driven pump-type power steering systems. The flow rate of the oil delivered from the oil pump is controlled to allow a driver to operate a steering wheel with optimum steering force.

The oil pump and motor are always driven even when power assist is unnecessary. Thus, the system operates at low efficiency.

An electric power steering system in which an electric motor is connected to a steering shaft or steering rack, is an efficient demand type power steering. However, it is difficult to ensure fail-safe operation due to possible malfunction such as motor, gear or screw lock.

SUMMARY OF THE INVENTION

In accordance with the present invention, there is provided a hydraulic control cylinder positioned at a hollow end of the rack with a steering rod having a first end received in the hollow end of the rack and a second end of the rod received in the control cylinder. A control piston is located on the steering rod and positioned interiorly of the control cylinder. Additional hydraulic lines are connected to the control cylinder on opposite sides of the control piston. A second hydraulic pump and second electric motor are provided. A stability control arrangement is provided for controlling the second electric motor so that the pump, driven by the motor, provides hydraulic fluid to the additional hydraulic lines so as to provide lateral movement of the steering rod against the steering rack.

In accordance with the present invention, there is provided a hydrostatic power steering system including an electric motor and comprising a pinion fixedly connected to a steering shaft and meshingly connected with a rack of the steering mechanism. A hydraulic pump is provided and a power steering piston, responsive to movement of the rack, is positioned in a power steering chamber. The chamber is divided by a valve land into first and second portions, each of which are connected to first and second hydraulic lines. At least a pair of vehicle wheels are connected to the rack and piston by a linkage mechanism. A torque sensor arrangement is connected to the steering shaft for providing an output torque signal to a power steering controller and the electric motor is responsive to a command signal generated by the power steering controller. A fluid reservoir is provided for containing hydraulic fluid utilized in the hydraulic portion of the steering system. Electrically operated valves are provided in the steering system and connected to each of the first and second hydraulic lines and adapted to receive a signal from the power steering controller for controlling flow of hydraulic fluid to the power steering chamber. The electrically operated valves are inoperative within a predetermined zone defined by the command signal and the output torque signal.

A further object of the present invention is to provide the power steering controller with a command computing circuit and a motor control circuit. The output torque signal and a vehicle speed signal are transmitted to the command computing circuit and the motor control circuit outputs the command signal to control the electric motor.

Another object of the present invention is to provide a hydrostatic power steering system in which the predetermined zone of inoperation increases at increased vehicle speed when a ratio of the command signal current is divided by the output torque signal so as to define a line of minimum slope. The predetermined zone of inoperativeness will decrease at decreased vehicle speed when the ratio of the command signal current divided by the output torque signal defines a line having a maximum slope within the predetermined zone.

It is an additional object of the present invention to also provide means for transmitting a signal which is indicative of steering wheel angle, means for transmitting a signal indicative of yaw rate, and means for transmitting a signal indicative of vehicle speed. The transmitted signals are received by the stability control means as is a signal which is indicative of the position of the steering rod. The signals are received by the stability control means so as to provide an output signal to the electric motors involved in the control operation thereby driving the hydraulic pumps at a rate which permits proper stability and steering of the vehicle.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 1:
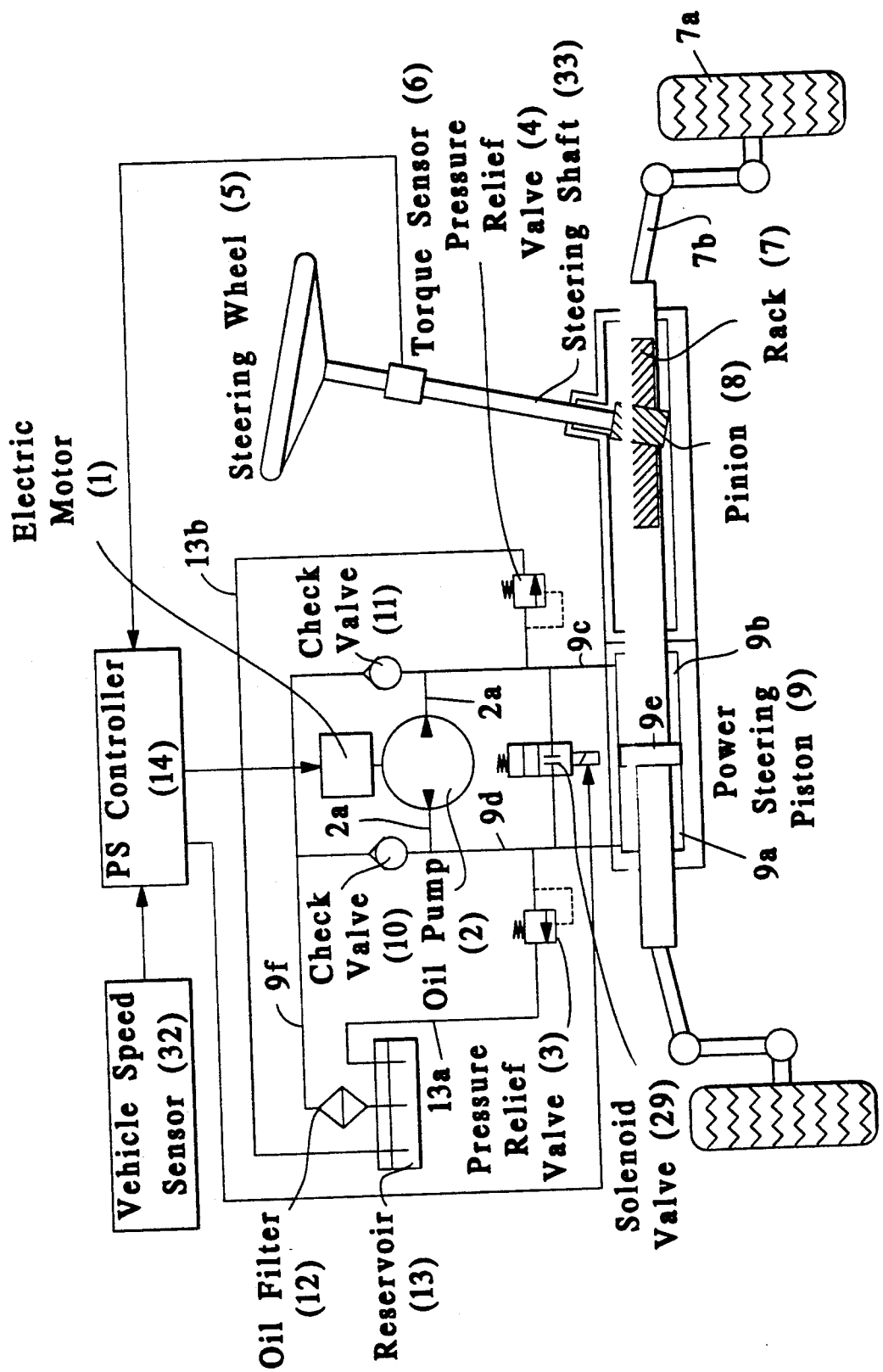
FIG. 1 is the first embodiment of the hydrostatic electric power steering system.

FIG. 1 shows a configuration of the hydrostatic electric power steering system. Therein, a steering wheel 5 is connected via steering shaft 33 to a pinion gear 8 fixedly attached to the steering shaft. The pinion gear 8 is in meshing engagement with the rack 7 of the known type of rack and pinion steering. A hydraulic pump is indicated at reference numeral 2 and is of the bidirectional type so as to provide hydraulic fluid, under pressure, to through pump output conduits 2a. An electric motor 1 operates the pump 2. A reservoir 13 is provided for supplying the hydraulic fluid to the pump 2 and for receiving the working hydraulic fluid back into the reservoir from a drain system to be discussed later. The hydraulic fluid is pumped, under the action of the driving electric motor 1 and bidirectional oil pump 2 from the reservoir through an oil filter 12. Hydraulic conduit 9f provides the fluid to a pair of hydraulic lines 9c and 9d. In normal operation, the hydraulic fluid is pumped from one chamber to the other. Fluid is supplied from the reservoir when the fluid level is low due to leakage or other flow problems. A check valve 10 is located in hydraulic line 9d as is a check valve 11 in hydraulic line 9c. The check valves 10 and 11 may be of any conventional structure which would permit flow in a first direction and block flow in the opposite direction. The hydraulic fluid in lines 9c and 9d is provided to first and second power steering chambers 9a and 9b, respectively. A valve land 9e separates the two chambers from one another. The hydraulic lines 9d and 9c are connected to the chambers 9a and 9b, respectively. The power steering system 9 is integral with the rack 7 and is connected, at either end, through a steering linkage 7b to the wheels 7a, to be steered. A pair of hydraulic return lines 13a and 13b are interconnected with hydraulic lines 9d and 9c. The hydraulic return lines are normally closed by pressure relief valves 3 and 4, respectively. The pressure relief valves may be of any known type which would open under conditions of overpressure in lines 9c and 9d so as to permit the return of the hydraulic fluid from hydraulic lines 9c and 9d through the return lines 13a and 13b to the reservoir 13. Of course, the pressure relief valves would again shut-off flow of the hydraulic fluid through the hydraulic return lines upon the pressure in the system reaching equilibrium.

Figure 2:
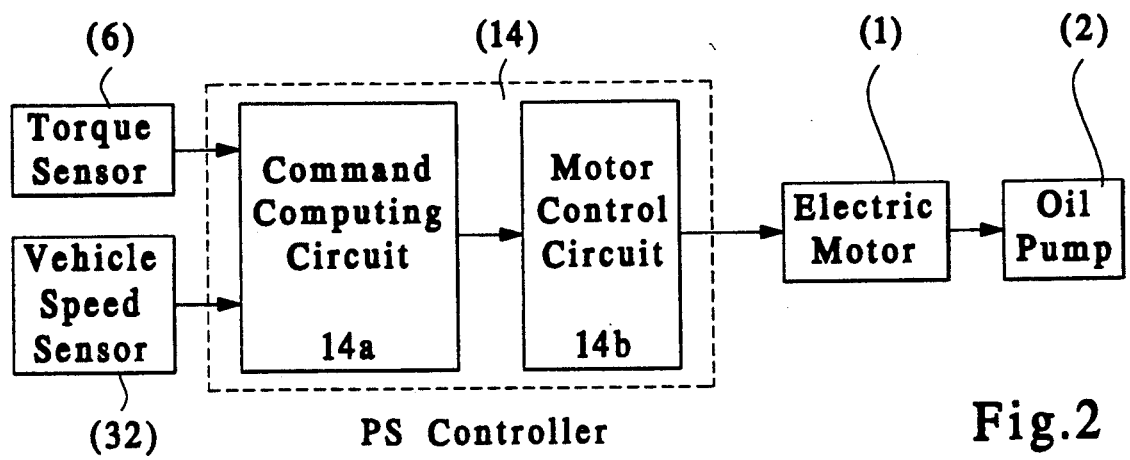
FIG. 2 is a block diagram of the first embodiment of the hydrostatic electric power steering system.

With reference to FIG. 2, a power steering controller 14 is provided for controlling the electric motor 1 which drives the hydraulic pump 2. The power steering controller comprises a command computing circuit 14a and a motor control circuit 14b. In order to provide control variables to the power steering controller 14, a vehicle speed sensor 32 is provided which transmits a signal indicative of the vehicle speed to the command computing circuit 14a. A torque sensor 6 connected with the steering shaft 33 also provides a signal which is indicative of the torque applied to the steering shaft to the command computing circuit 14a. The values received by the command computing circuit 14a are transmitted to the motor control circuit 14b. The motor control circuit is connected to the electric motor 1 so as to control operation thereof and, thereby, control operation of the bidirectional oil pump 2.

Figure 3:
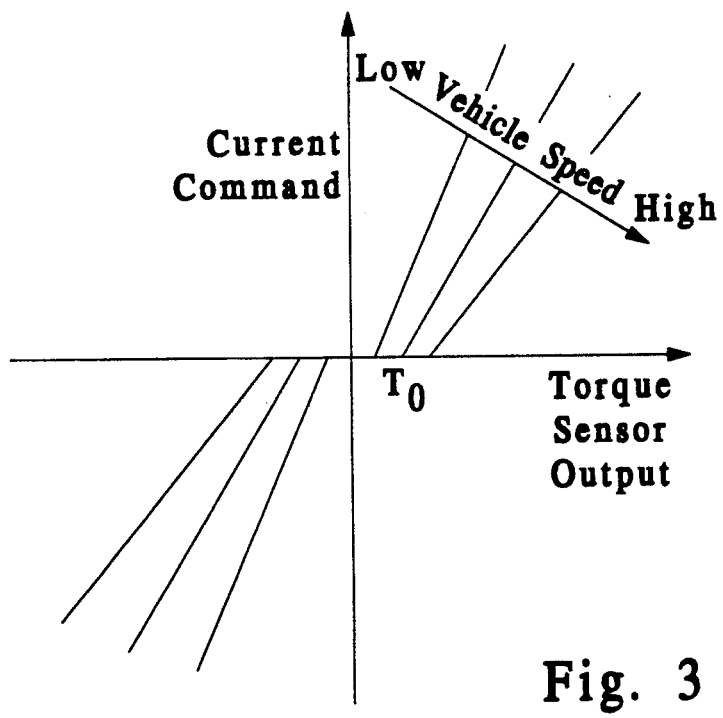
FIG. 3 is a power assist gain schedule of the first embodiment of the hydrostatic electric power steering.

With reference to FIG. 3, a power assist gain schedule of the first embodiment is discussed. Therein, it can be seen that at a relatively high speed of the vehicle, the torque sensor output is greater than at low vehicle speed and the current command from the command computing circuit is greater at lower torque sensor output. Accordingly, at relatively high vehicle speed, a predetermined zone is provided in which a solenoid valve 29 (to be discussed later) is held in an open condition and the electric drive motor 1 is not actuated. The zone of inoperativeness of the solenoid valve 29 is relatively large and the slope of a line therethrough is relatively small. The slope is calculated by dividing the torque sensor output into the current command. Conversely, at relatively low vehicle speeds, the predetermined zone is small and the slope of a line, calculated in the foregoing manner, is larger.

With respect to the operation of the embodiment of FIG. 1, when the vehicle is moving in a straight line, power assist of the steering is unnecessary. In this condition, the solenoid valve 29 is open and the right chamber and left chamber 9b and 9a, respectively, are connected through the solenoid valve 29. The power steering controller provides an input signal to the solenoid valve 29 to control the opening or closing of the solenoid valve. When a driver of the vehicle turns the steering wheel 5 during movement of the vehicle and the torque sensor output is within the predetermined zone, the solenoid valve 29 remains open and the electric motor 1 is not driven. Once the torque sensor output exceeds the threshold of the predetermined zone, the solenoid valve 29 closes and the electric motor 1 is actuated. As discussed, the operation of the solenoid valve is dependent upon the output from the controller 14 based upon the torque sensor and vehicle speed sensor inputs thereto.

During normal power steering operation, when the driver of the vehicle turns the steering wheel 5, the torque applied to the steering shaft 33 builds up. The torque is detected by the torque sensor 6 and the torque signal is provided to the power steering controller 14. The command computing circuit 14a in the power steering controller 14 calculates the current command signal to the motor control circuit and transmits a signal to the solenoid valve 29 to open. The motor control circuit 14b provides the control signal to the electric motor. The oil pump 2, driven by the electric motor 1, will pump oil into one chamber 9a or 9b from the other chamber of the hydraulic cylinder. The oil flow will push against the power steering piston 9 and function as a hydraulic power assist in the steering of the vehicle. The control signal to the electric motor is based on a torque feedback control type in view of the torque sensor 6.

The oil pump 2 functions as a reduction gear on the hydrostatic electric power steering system. On the conventional electric power steering, as discussed above, the reduction ratio is usually around 10. The hydrostatic electric power steering allows a much greater reduction ratio using a large power steering piston diameter and a small high speed pump. In the conventional electric power steering system, the motor is operated at around 1000 rpm at maximum power so as to obtain the reduction ratio of 10. In contrast, the hydrostatic electric power steering motor of the present invention can be operated at about 3000 rpm or more at maximum power. This permits the hydrostatic electric power steering motor of the present invention to be much smaller than the motors in the conventional power steering systems.

It is desirable for the steering wheel and steering system to return to the straight position when the driver removes his or her hands from the steering wheel or grips the steering wheel with a light relaxed grip. This phenomena is caused by the force applied to the rack which is generated by suspension geometry. In these situations, the torque applied to the steering shaft is within the predetermined zone and the solenoid valve is open. Thus, the force applied to the rack returns the steering to the straight-ahead position.

Under certain conditions, an electric power system can fail. Such conditions would be a lack of power for the electric motor, motor lock-up or pump lock-up. If such a failure of the electric power system of the present invention occurs, the driver of the vehicle can still safely operate the vehicle. If, for example, the driver wanted to steer to the right, oil would flow from the right to the left chamber, i.e., from chamber 9b to 9a, through the solenoid valve 29. Accordingly, the driver can steer the same as regular steering without power assist. Additionally, when the system experiences a pressure overload as previously discussed, the spring loaded pressure release valves open, and the steering system again functions in a non-power assist mode of operation.

In the second embodiment of the invention and in all subsequently discussed embodiments of the invention, like reference numerals will be utilized to identify like elements previously discussed.

The second embodiment of the invention is substantially similar to that discussed with regard to the preceding embodiment. A difference exists in the provision of a pair of solenoid valves 29 and 30 which are arranged in the hydraulic circuit as follows. The pair of solenoid valves 29 and 30 replace the solenoid valve 29 of the previous embodiment. A difference in operation of the two embodiments is in the provision of the two solenoid valves which permit the hydraulic fluid to return to the reservoir 13 instead of to the other chamber of the cylinder in which the power steering piston 9 is located. Each of the solenoid valves 29 and 30 receive signals from the power steering controller 14 in the manner discussed with respect to the embodiment of FIG. 1. However, each of the solenoid valves 29 and 30 are located between the hydraulic lines leading to the chamber of the power assist steering arrangement and the return line to the reservoir. Accordingly, when the driver would want to steer to the left, the hydraulic fluid would flow from the right side of the chamber, i.e., side 9b through the hydraulic line 9c, the solenoid valve 30 and the return line 13b so as to drain back to the reservoir 13.

Figure 5:
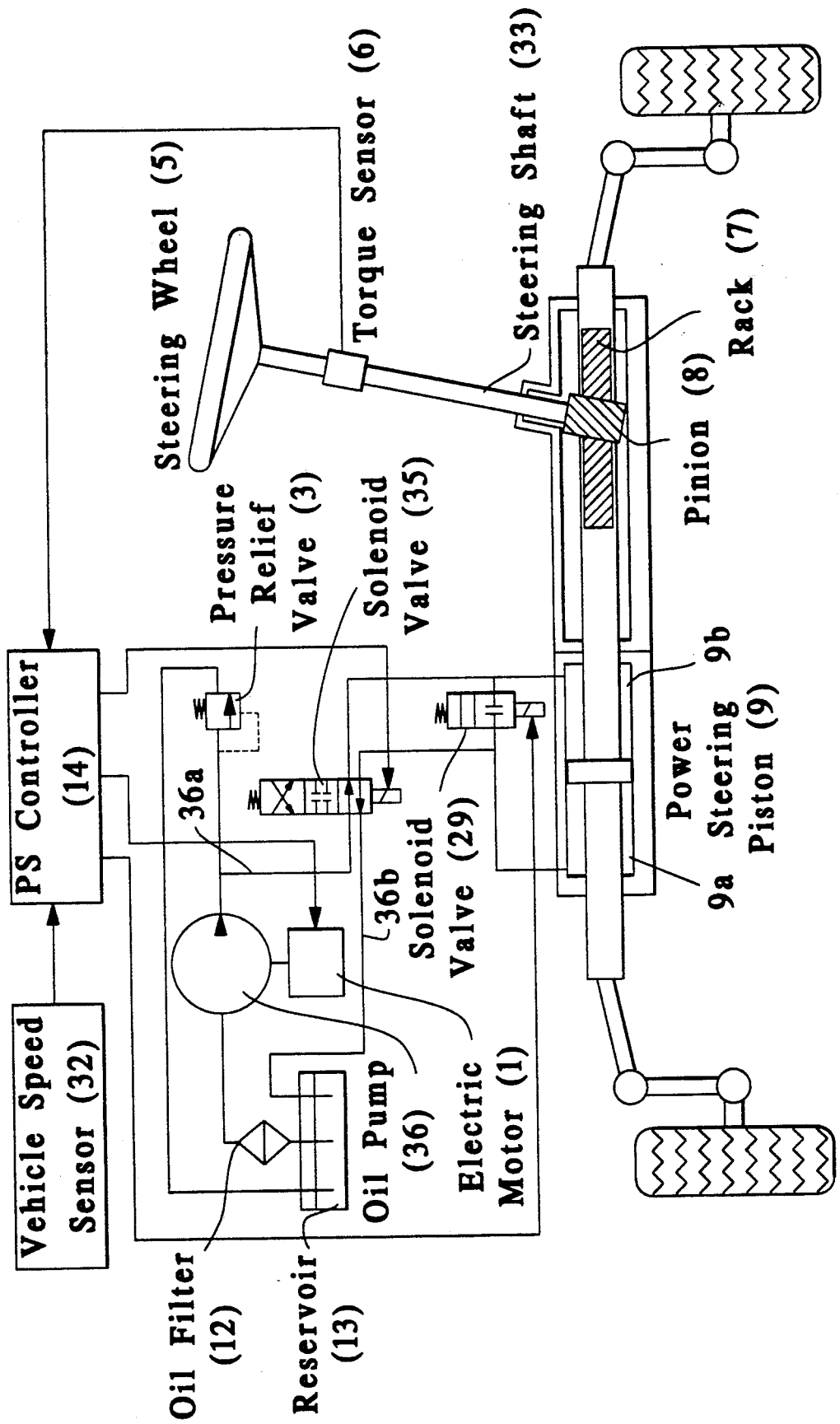
FIG. 5 is a third embodiment of the hydrostatic electric power steering system.

In the embodiment of FIG. 5, the bidirectional oil pump 2 of the first embodiments has been replaced by a unidirectional oil pump 36. In order to provide for the flow of hydraulic fluid to each side of the power steering chamber in which the power steering piston 9 is located, a three-way solenoid valve 35 is provided. The solenoid valve receives its operational control from the power steering controller 14 in the manner of the previously discussed embodiments. The solenoid valve 29, for controlling the flow of the hydraulic fluid from one side of the chamber to the opposite side of the chamber remains the same as in the first embodiment and is likewise controlled by the power steering controller 14 in the same manner as in the first embodiment.

Figure 4:
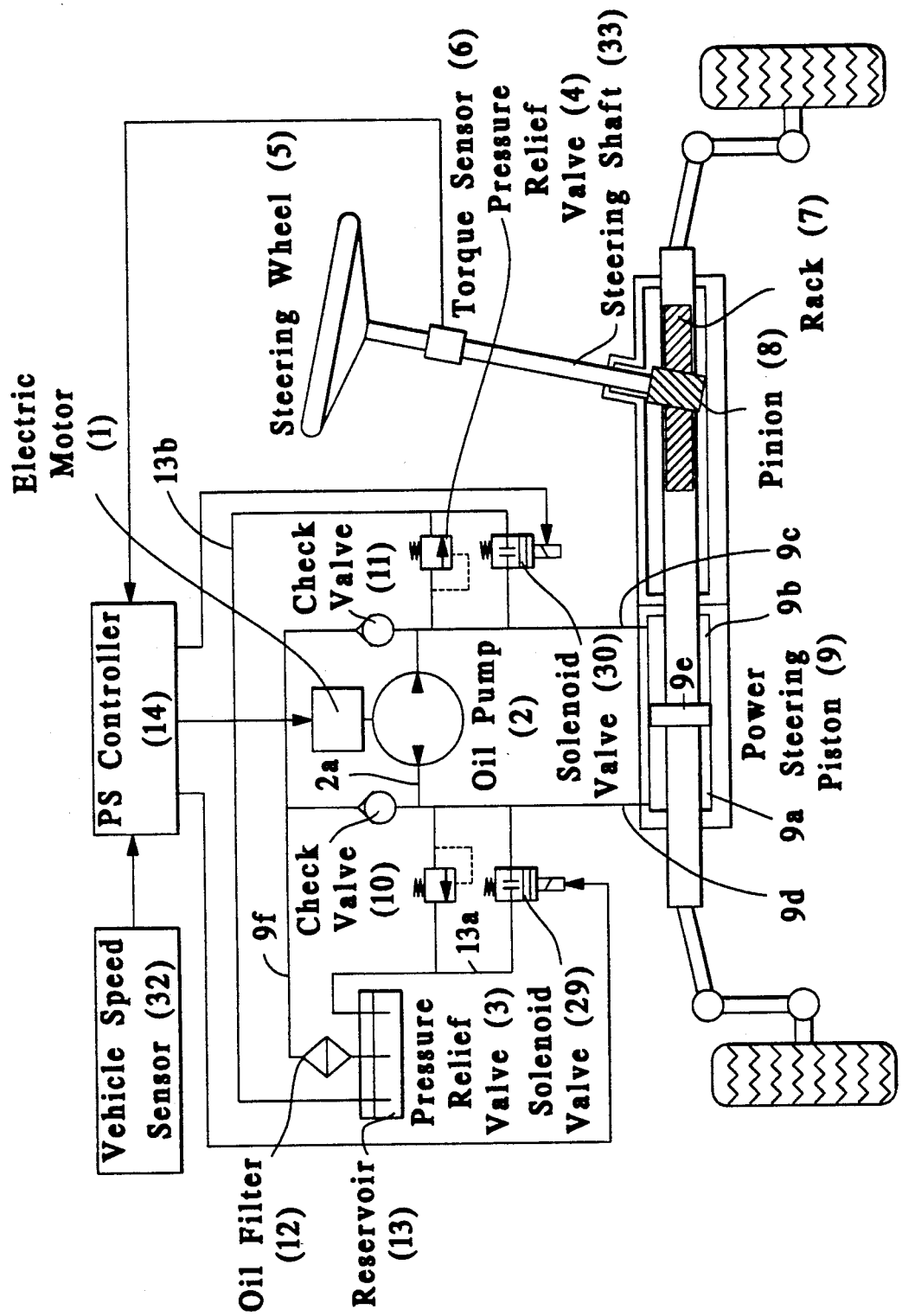
FIG. 4 is a second embodiment of the hydrostatic electric power steering system.

In the embodiment of FIG. 5, a pump outlet conduit 36a is provided which extends from the outlet of the pump to the three-way solenoid valve 35. A two-way solenoid valve 35 is designed so as to provide fluid flow to one side of the chamber 9a or 9b dependent upon steering conditions. As shown in the drawing, hydraulic fluid is discharged from the pump 36 through the outlet conduit 36a through the two-way solenoid valve 35 and into the right hand side 9b of the power steering cylinder. The solenoid valve 29 would again function in the same manner as previously discussed so as to permit outflow of the fluid through the return line 36b leading to the reservoir 13. When moved to its lowermost position, the two-way solenoid valve 35 provided fluid to the left side of the power steering piston 9 in the chamber section 9a and drains fluid from the right side 9b of the chamber back to the reservoir 13. In all other respects, operation of the embodiment of FIG. 5 is the same as the foregoing discussions with regard to FIGS. 1 and 4.

Figure 6:
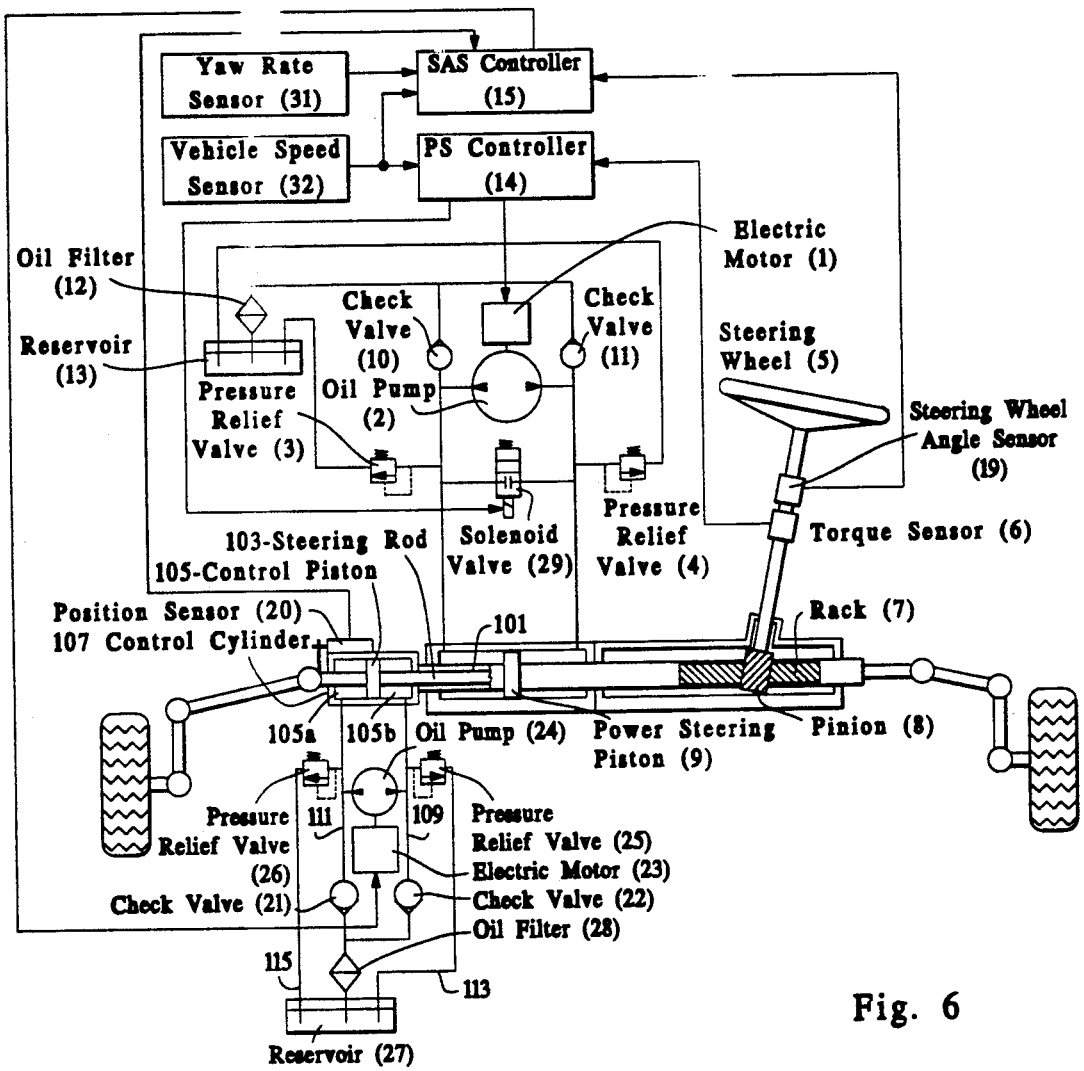
FIG. 6 is similar to the first embodiment of the hydrostatic electric power steering system and incorporates the stability augmentation system of the present invention.
Figure 7:
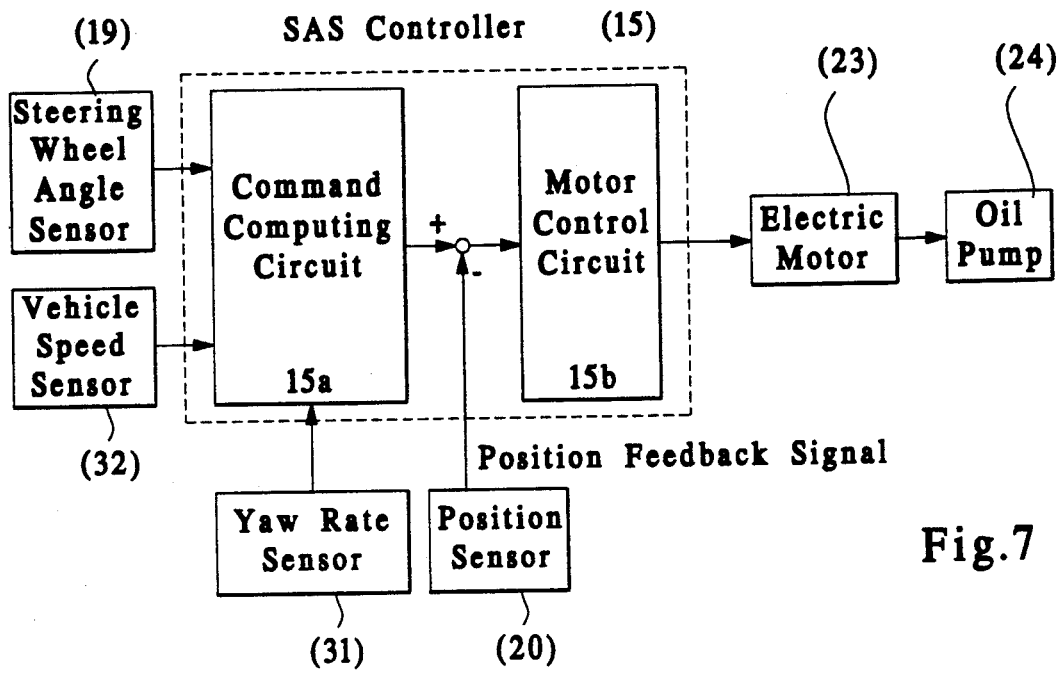
FIG. 7 is a block diagram of the first embodiment of the hydrostatic electric power steering system incorporating the stability augmentation system.

The embodiment of FIG. 6 incorporates a hydrostatic stability augmentation system with the hydrostatic electric power steering system previously discussed. Reference may also be had to the block diagram shown in FIG. 7 for a schematic representation of the control system of the hydrostatic stability augmentation system. With regard to the hydrostatic electric power steering system, all elements are the same as previously discussed with regard to the FIG. 1 embodiment. However, substantial changes are provided for the stability augmentation system and its controller. A hydraulic control cylinder 107 is mounted at one end of the shaft to which the rack 7 is affixed and which carries the power piston 9. The steering rack is hollow at the end adjoining the control cylinder so as to define a space 101 therein which receives a steering rod 103. The steering rod 103 is provided with a control piston 105 which is received in the control cylinder 107 so as to define two hydraulic chambers therein, one on either side of the control piston 105 the right and left chambers being labeled 105a and 105b, respectively. Each chamber is connected to a hydraulic conduit 109 and 111. The hydraulic conduits are provided with hydraulic pressure by an oil pump 24 controlled by an electric motor 23. Hydraulic fluid is drawn from fluid reservoir 27, through an oil filter 28 to the respective conduits through check valves 21 and 22. The check valves 21 and 22 and the conduits 109 and 111 being substantially the same as the conduits previously discussed with regard to FIG. 1, specifically, conduits 9d and 9c and check valves 10 and 11. Fluid return conduits are provided between the conduits 109 and the reservoir 27. The conduits are indicated at reference numerals 113 and 115. Pressure relief valves 25 and 26 are positioned in the return conduits 113 and 115. The stability augmentation system is provided with a controller 15 and is shown in schematic form in FIG. 7. Therein, the stability augmentation system receives an input from a steering wheel angle sensor 19, a vehicle speed sensor 32, a yaw rate sensor 31 and a position sensor 20. The position sensor 20 provides a position feedback signal determined by the position sensor which senses the position of the steering rod 103 in its movements back and forth through the control cylinder 107. The command computing circuit 15a determines the command signal for the electric motor 23 by analyzing the signals received from the yaw rate sensor, vehicle speed sensor and steering wheel angle sensor. The motor control circuit 15b then operates the electric motor 23 using the command signal from the command computing circuit 15a and feedback signal from the position sensor 20 located at the steering rack. The electric motor 23 drives the oil pump 24 in the same manner as discussed with regard to the embodiment of FIG. 1. The difference between the hydrostatic electric power steering system of FIG. 1 and the hydrostatic stability augmentation system of FIG. 6 is in the feedback control system. The hydrostatic electric power steering control loop is a torque feedback control system and the hydrostatic stability augmentation system is a position feedback control system. The electric motor 23 and oil pump 24 provide an oil flow from one chamber of the control piston 107 to the other chamber of the control cylinder. The hydraulic fluid flow causes lateral movement of the steering rod against the steering rack.

Figure 9:
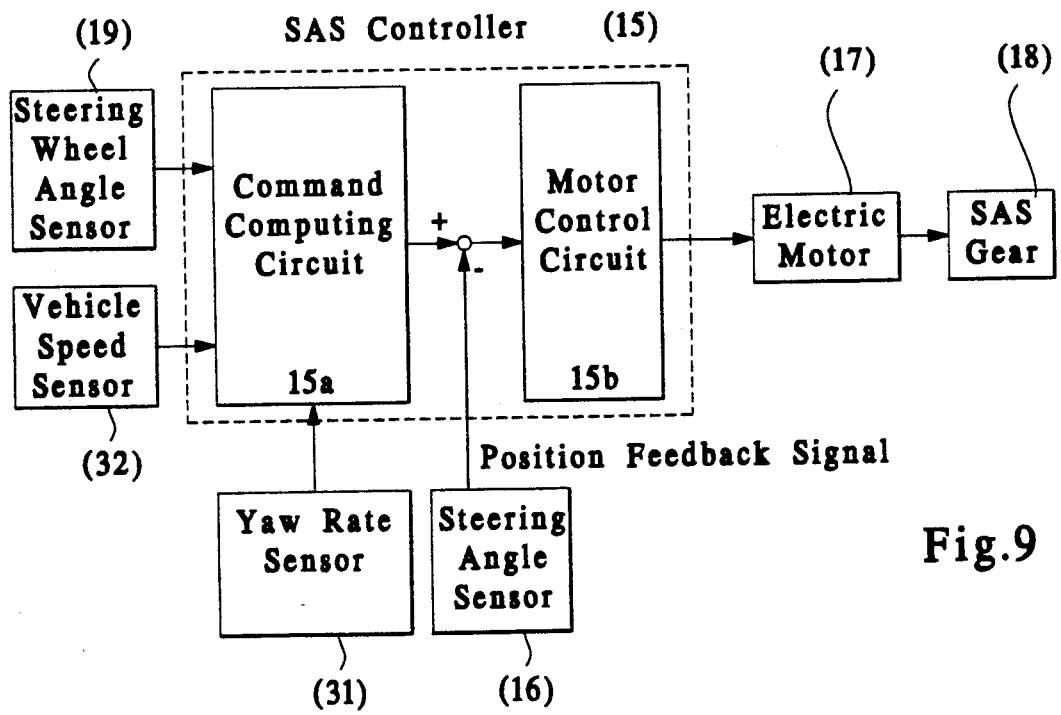
FIG. 9 is a block diagram of the second embodiment of the hydrostatic electric power system with the stability augmentation system.
Figure 8:
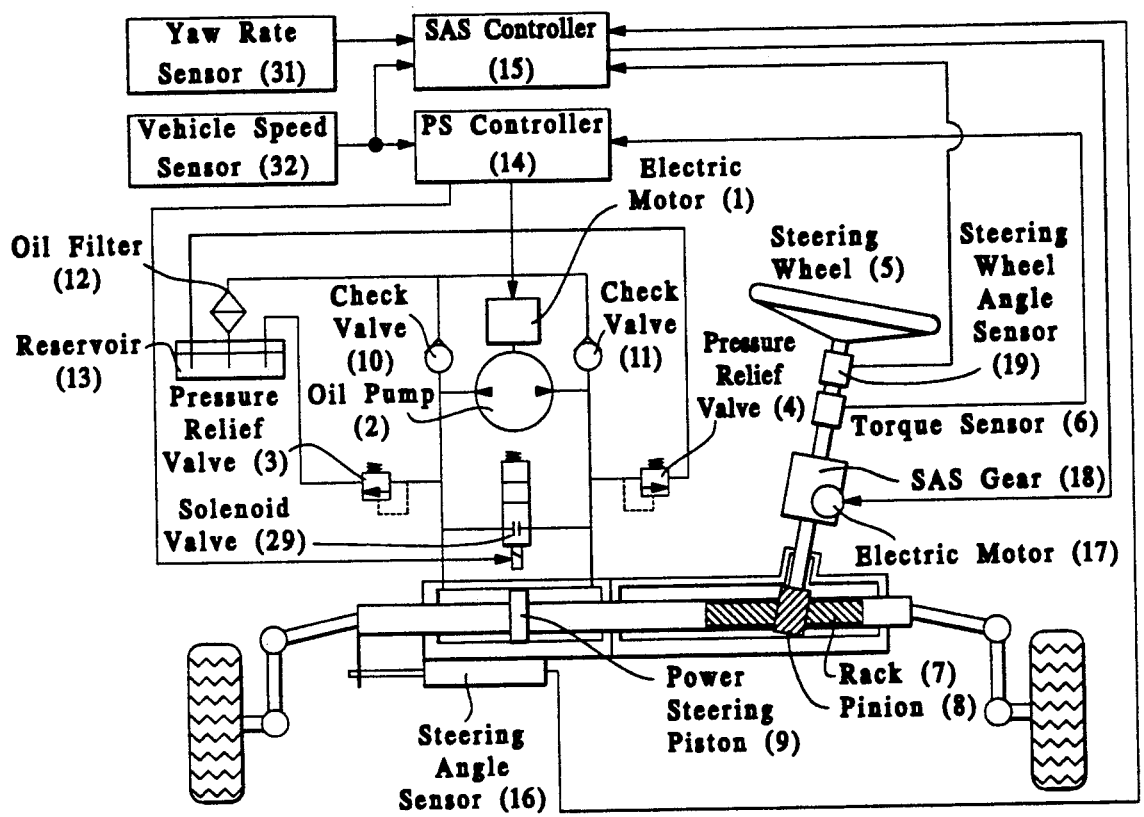
FIG. 8 is the second embodiment of the hydrostatic electric power steering with the stability augmentation system.

In the embodiment of FIG. 8, reference may also be had to FIG. 9 for a schematic representation of the controller disclosed therein. With reference to FIG. 9, the command computing circuit 15a again receives inputs from a yaw rate sensor 31, vehicle speed sensor 32 and steering wheel angle sensor 19. These inputs being the same as those discussed in the embodiment of FIG. 6. A steering angle sensor 16 also provides a position feedback signal so as to alter the signal transmitted from the command computer circuit 15a to the motor control circuit 15b. The steering angle sensor is mounted in a manner similar to that of the position sensor 20 of the embodiment of FIG. 6. The motor control circuit 15b again provides a signal for operation of the electric motor 17 which in turn provides a signal to a stability augmentation system gear arrangement 18. An electric motor 17 is provided in conjunction with the stability augmentation system gear arrangement 18. The stability augmentation system gear set 18 is positioned at the steering shaft 33.

Figure 10:
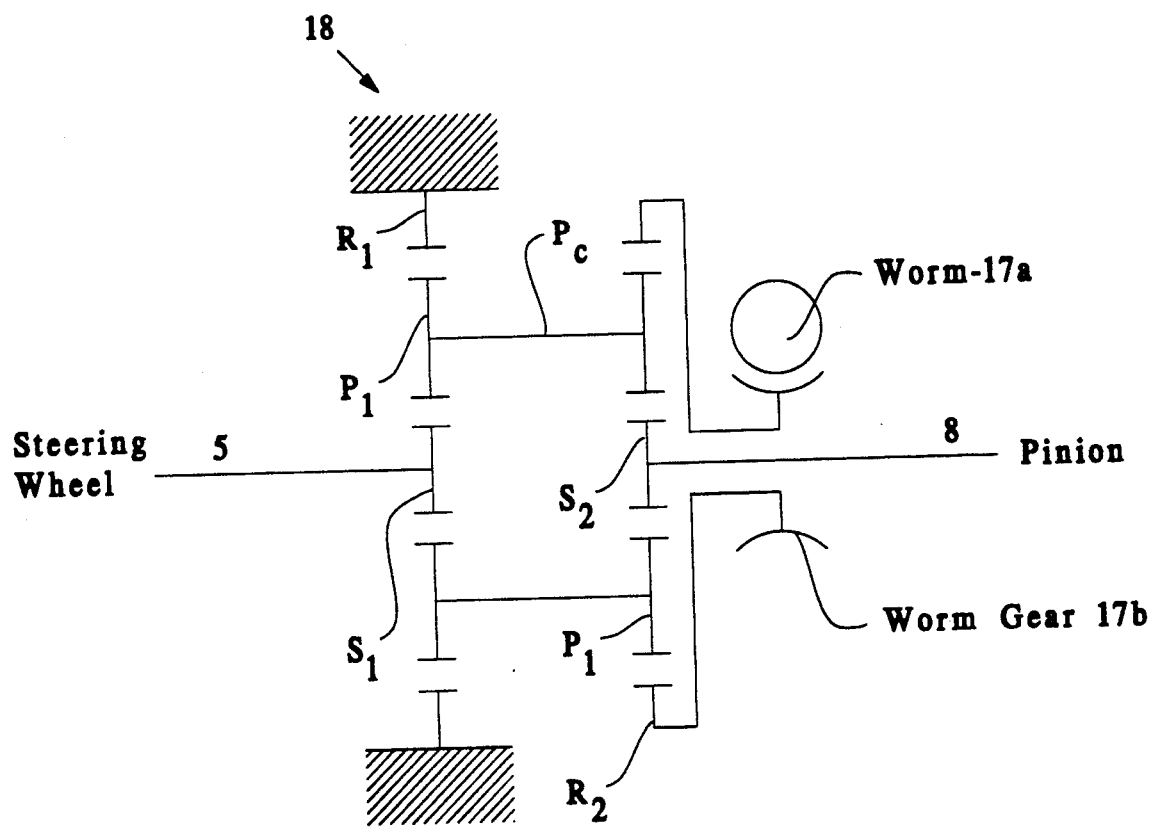
FIG. 10 is a stability augmentation system gear train of the second embodiment of the hydrostatic electric power steering system incorporating the stability augmentation system.

As shown in FIG. 10, two planetary gear sets are connected in series so as to receive an input from the steering wheel 5 and provide an output to the pinion gear 8. As disclosed therein, a first planetary gear set has a ring gear $R_1$ fixed to a casing member. A sun gear $S_1$ receives an input from the steering wheel t with a planet gear $P_1$ meshingly interconnected between the sun gear $S_1$ and the ring gear $R_1$. The second planetary gear set is connected to the first planetary gear set by a common carrier element $P_c$. A ring gear $R_2$ is connected to a worm gear which is driven by the electric motor 17. An output is provided to the pinion 8 by the sun gear $S_2$. The rotation of the ring gear $R_2$ is provided by the worm gear 17a driven by the electric motor 17. Rotation of the ring gear $R_2$ providing additional steering angle against the driver's input through the steering wheel 5 by providing a reaction force to the ring gear $R_2$. The lead angle between the worm 17a and the worm gear 17b is selected so as to provide a self-locking condition due to the meshing interconnection of the gears. As previously discussed, the present steering system provides a fail safe operational mode when electric power is lost or when the control system or hydraulics become due to contaminants or other operational blocking actions. Since the interconnection between the worm 17a and the worm gear 17b does not allow reversible movement, the steering system would then revert to use as a regular system which would not otherwise be provided with the stability augmentation system.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A hydrostatic power steering system including an electric motor comprising:
   a pinion fixedly connected to a steering shaft and meshingly connected with a rack;
   a hydraulic pump;
   a power steering piston responsive to movement of said rack positioned in a power steering chamber; said chamber being divided by a land into first and second chamber portions, the first chamber portion being connected to a first hydraulic line and the second chamber portion being connected to a second hydraulic line, at least a pair of wheels connected to said rack and piston by a linkage mechanism;
   torque sensor means connected to said steering shaft for providing an output torque signal to a power steering controller, said electric motor responsive to a command signal generated by said power steering controller;
   a reservoir for providing hydraulic fluid to said hydraulic lines;
   a hydraulic control cylinder positioned at a hollow end of the rack;
   a steering rod having a first end received in the hollow end of the steering rack and a second end of the steering rod received in said control cylinder;
   a control piston located on said steering rod and positioned interiorly of said control cylinder;
   third and fourth hydraulic lines connected to said control cylinder on opposite sides of said control piston;
   a second hydraulic pump;
   a second electric motor for driving said second hydraulic pump; and,
   stability control means for controlling said second electric motor, said second hydraulic pump providing said hydraulic fluid to said third and fourth hydraulic lines so as to provide lateral movement of said steering rod against the steering rack.

2. The hydrostatic power steering system of claim 1, further comprising:
   a hydraulic feed line for supplying said hydraulic fluid to said first and second hydraulic lines.

3. The hydrostatic power steering system of claim 2, wherein said hydraulic pump is an oil pump, and further comprising:
   a first check valve positioned in said first hydraulic line;
   a second check valve positioned in said second hydraulic line; and
   oil pump outlet conduit connected from said oil pump to said first and second hydraulic lines at a location downstream of said first and second check valves.

4. The hydrostatic power steering system of claim 1, further comprising:
   a first hydraulic return line connected to said first hydraulic line and said reservoir;
   a second hydraulic return line connected to said second hydraulic line and said reservoir;
   first and second pressure relief valves positioned in said first and second hydraulic return lines, respectively; said pressure relief valves being responsive to overpressure in said first and second hydraulic lines to reduce said overpressure by opening and permitting said hydraulic fluid to return to said reservoir.

5. The hydrostatic power steering system of claim 1, wherein said power steering controller comprises a command computing circuit and a motor control circuit.

6. The hydrostatic power steering system of claim 5, wherein said output torque signal and a vehicle speed signal are transmitted to said command computing circuit, and said motor control circuit outputs a command signal to said electric motor.

7. The hydrostatic power steering system of claim 1, including an electrically operated valve means to which said first and second hydraulic lines are connected for controlling flow of hydraulic fluid to said power steering chamber based on signals received from said power steering controller, said electrically operated valve means being inoperative within a predetermined zone defined by said command signal and said output torque signal.

8. The hydrostatic power steering system of claim 7, wherein said predetermined zone increases at increased vehicle speed when a ratio of the command signal divided by said output torque signal defines a line of relatively small slope, said predetermined zone decreases at decreased vehicle speed when the ratio of said command signal divided by said output torque signal defines a line of relatively larger slope.

9. The hydrostatic power steering system of claim 1, wherein said hydraulic pump is an oil pump, and further comprising:
an outlet conduit having a first end connected to said oil pump and a second end connected to a three-way solenoid valve, said first and second hydraulic lines connected to said three-way solenoid valve; and
a return conduit connected to said three-way solenoid valve and said reservoir.

10. The hydrostatic power steering system of claim 1, further comprising:
a third check valve in said third hydraulic line; and,
a fourth check valve in said fourth hydraulic line.

11. The hydrostatic power steering system of claim 1, further comprising:
a steering wheel angle sensor for sensing and transmitting a signal indicative of steering wheel angle to said stability control means;
a yaw rate sensor for sensing vehicle yaw rate and transmitting a signal indicative of yaw rate to said stability control means; and
a vehicle speed sensor for sensing vehicle speed and transmitting a signal indicative of vehicle speed to said stability control means.

12. The hydrostatic power steering system of claim 11, further comprising:
a position sensor connected to said steering rod for determining position of said steering rod and transmitting a signal indicative of the position to said stability control means.

13. The hydrostatic power steering system of claim 1, further comprising:
check valve means located in each of said third and fourth hydraulic lines for preventing a return flow to said reservoir; and,
relief valve means located in third and fourth hydraulic return lines to drain overpressure from said third and fourth lines.

14. A hydrostatic power steering system including an electric motor comprising:
a pinion fixedly connected to a steering shaft and meshingly connected with a rack;
a hydraulic pump;
a power steering piston responsive to movement of said rack positioned in a power steering chamber; said chamber divided by a land into first and second chamber portions, the first chamber portion being connected to the first hydraulic line and the second chamber portion being connected to the second hydraulic line, at least a pair of wheels connected to said rack and piston by a linkage mechanism;
torque sensor means connected to said steering shaft for providing an output torque signal to a power steering controller, said electric motor responsive to a command signal generated by said power steering controller;
a reservoir for providing hydraulic fluid to said hydraulic lines;
a second electric motor;
stability control means for controlling said second electric motor;
steering wheel angle sensor means connected to said steering shaft for providing a steering wheel angle output signal to said stability control means; and,
steering angle sensor means connected to a steering rod located in a hollow end portion of the power steering piston for providing a steering angle output signal to said stability control means.

15. The hydrostatic power steering system according to claim 14, including an electrically operated valve means connected to each of said first and second hydraulic lines and adapted to receive a signal from said power steering controller for controlling flow of said hydraulic fluid to said power steering chamber; wherein said electrically operated valve means is inoperative within a predetermined zone defined by said command signal and said output torque signal.

* * * * *